United States Patent
Dingle et al.

(10) Patent No.: US 7,707,825 B2
(45) Date of Patent: May 4, 2010

(54) APPARATUS AND METHOD FOR REDUCTANT DOSING OF AN EXHAUST

(75) Inventors: Philip J. G. Dingle, Rochester, MI (US); Joachim Kupe, Davisburg, MI (US)

(73) Assignee: Delphi Technologies, Inc., Troy, MI (US)

( * ) Notice: Subject to any disclaimer, the term of this patent is extended or adjusted under 35 U.S.C. 154(b) by 603 days.

(21) Appl. No.: 11/897,746

(22) Filed: Jun. 6, 2006

(65) Prior Publication Data

US 2007/0295003 A1 Dec. 27, 2007

Related U.S. Application Data

(62) Division of application No. 10/637,365, filed on Aug. 8, 2003, now abandoned.

(60) Provisional application No. 60/427,205, filed on Nov. 18, 2002.

(51) Int. Cl.
*F01N 3/00* (2006.01)

(52) U.S. Cl. ............................. 60/286; 60/274; 60/277; 60/295; 60/303; 60/324

(58) Field of Classification Search ................... 60/274, 60/277, 286, 295, 301, 303, 324
See application file for complete search history.

(56) References Cited

U.S. PATENT DOCUMENTS

| | | | | |
|---|---|---|---|---|
| 5,605,042 A * | 2/1997 | Stutzenberger | ............... | 60/286 |
| 5,884,475 A * | 3/1999 | Hofmann et al. | ............... | 60/274 |
| 6,432,373 B1 * | 8/2002 | Tanazawa et al. | ........... | 423/235 |
| 6,848,251 B2 * | 2/2005 | Ripper et al. | .................. | 60/286 |
| 7,100,366 B2 * | 9/2006 | Hager et al. | ................... | 60/286 |
| 2007/0101700 A1 * | 5/2007 | Masaki et al. | ................. | 60/286 |
| 2007/0163232 A1 * | 7/2007 | Ueno | ........................... | 60/274 |

* cited by examiner

*Primary Examiner*—Tu M Nguyen
(74) *Attorney, Agent, or Firm*—Thomas N. Twomey

(57) ABSTRACT

A high-pressure metering pump for providing reductant in a single fluid engine exhaust dosing system having a solenoid for actuating a piston slidably received within an inner bore of a valve housing of the pump, the inner bore having a pressure chamber with an inlet check valve and an outlet check valve; and wherein movement of the piston causes high pressure reductant to be received at an atomizer of the system, the atomizer being disposed in a location to cause a maximum reduction of undesirable pollutant in the combustion gases of an engine.

10 Claims, 7 Drawing Sheets

APPARATUS AND METHOD FOR REDUCTANT DOSING OF AN EXHAUST

CROSS-REFERENCE TO RELATED APPLICATIONS

This application is a division of U.S. patent application Ser. No. 10/637,365, filed Aug. 8, 2003 now abandoned, and claims the benefit of U.S. Provisional Application No. 60/427,205, filed Nov. 18, 2002 the contents of which are incorporated by reference herein in their entirety.

TECHNICAL FIELD

Exemplary embodiments of the present invention are related to an apparatus and method for cleaning an exhaust gas of an internal combustion engine or other equivalent device.

BACKGROUND

Internal combustion engines emit undesirable pollutants in their exhaust stream. One such pollutant is nitrogen oxides such as nitrogen monoxide, nitrogen dioxide (hereinafter referred to simply as "NOx"). NOx is generated from automobile engines such as diesel engines, and large combustion apparatuses such as cogenerators. In addition, other combustion devices are sources of NOx emissions. Accordingly, exhaust systems are coupled to the engine to limit and/or remove the pollutants from the exhaust system. Technologies have been and continue to be developed to attenuate these emissions.

NOx is cleaned from exhaust gases of internal combustion engines through the use of catalysts. In addition to removing NOx, these catalysts also remove unburned hydrocarbons (HC) and carbon monoxide (CO). When the engine is operated with a lean air/fuel ratio, the catalyst is efficient at removing the HCs and COs because of the extra oxygen in the exhaust gas. However, the extra oxygen tends to inhibit the removal of NOx. Conversely, when the engine is operated with a rich air/fuel ratio, NOx removal efficiency of the catalyst is increased but the HC and CO removal efficiency is decreased.

In the case of exhaust gas from gasoline engines, NOx is usually removed by using so-called three-way catalysts. Also, in the case of large, stationary combustion apparatuses such as internal combustion engines for cogenerators, metal oxide catalysts such as $V_2O_5$ are used, and ammonia is introduced into exhaust gas, whereby nitrogen oxides in the exhaust gas are catalytically and selectively reduced.

However, in the case of an exhaust gas having a relatively high oxygen concentration such as those discharged from diesel engines and those discharged from gasoline engines operable in a lean state, efficient removal of NOx cannot be achieved with the above-described devices. Whereas homogeneous charge engines are able to utilize passive self-contained catalytic reduction techniques as exemplified by the three-way catalyst to control emissions of HC, CO, and NOx, so-called lean-burn engines as exemplified by the compression ignition engine may have high oxygen content in the exhaust which renders the conventional catalysis ineffective. In this case, techniques have been developed to meter an additional chemical reductant or reagent into the exhaust ahead of the reducing catalyst. In other cases, regeneration of an emissions control device, such as a particulate matter trap may require metered addition of a "fuel" ahead of an oxidizing catalyst in the exhaust stream so that necessary supplemental heat may be produced.

Conventional Selective Catalytic Reduction (SCR) of NOx involves injection of a typically aqueous urea solution or reductant into the exhaust system ahead of the SCR catalyst. Common reductants include aqueous urea in conjunction with selective catalytic reduction, and perhaps hydrocarbon diesel fuel for the supplemental heat necessary to initiate particulate trap regeneration. As used herein the term "urea" is meant to encompass urea in all of its commercial forms, including those containing: ammelide; ammeline; ammonium carbonate; ammonium bicarbonate; ammonium carbamate; ammonium cyanate; ammonium salts of inorganic acids, including sulfuric acid and phosphoric acid; ammonium salts of organic acids, including formic and acetic acid; biuret; cyanuric acid; isocyanic acid; melamine and tricyanourea.

The reductant dosing system is required to accurately meter the reductant into the exhaust system typically, while being responsive to the engine or after treatment control system. Further, it must present the reductant to the flowing exhaust gases in the most advantageous manner, which typically means that it must be finely atomized and well dispersed. A key requirement is that it should be fully decomposed by the time it reaches the catalyst, so that it may work with immediate effect, and that it should be homogeneously dispersed so that all active sites on the catalyst are engaged equally and non-preferentially to achieve maximum catalyst utilization.

Another requirement is that the reductant must be delivered in a manner that prevents clogging of the atomizer. This is due to the chemical composition of the reductant, which when exposed to heat may be affected by pyrolysis wherein the atomizer may become clogged.

Accordingly, most dosing systems have been designed for delivery of reductant in a two fluid system, namely the reductant and a supply of pressurized air. In most cases these systems utilize an air pressure assisted atomizer to achieve the quality of atomization and dispersion required, as well as meeting the operational robustness target specified. Such systems make use of the metering pump for delivering the reductant into a mixing chamber where it co-mingles with pressurized air from an onboard source such as may be required for an air-brake system or air-suspension in automotive applications. This mixture is conducted through a pipe to the remote dosing location in the exhaust where it exits through a simple atomizing nozzle into the exhaust stream. A typical air atomizing pressure for this type of system might be 2 bar.

Advantages of the known air-assisted or two fluid dosing systems include the ability to use a very simple and robust atomizing nozzle. Disadvantages include the need for air pressure in all applications, even those where the pressurized air is not normally available. Typically, the generation of air pressure requires expensive components which are heavy, bulky, noisy, and energy inefficient. Further, it is only applicable to in-exhaust injection, and is not suitable for in-cylinder injection which may be another similar viable emissions reduction technology.

Therefore, it is desirable to develop an efficient apparatus and method for reducing NOx contained in the exhaust gas or combustion gas of an internal combustion engine or other device requiring such an exhaust system while giving consideration to the aforementioned requirements.

SUMMARY OF THE INVENTION

The above discussed and other drawbacks and deficiencies are overcome or alleviated by providing a high-pressure metering pump for providing reductant in a single fluid engine exhaust dosing system, the high-pressure metering pump comprising: a solenoid for actuating a piston slidably received within an inner bore of a valve housing of the pump, the piston having at least two outer dimensions one being larger than the other and the inner bore having a pressure chamber with an inlet check valve and an outlet check valve; and wherein movement of the piston causes the at least two outer dimensions to at least partially move into and out of the pressure chamber thereby increasing the pressure of fluid received in the pressure chamber.

A method for providing a reductant to an exhaust of an engine having an exhaust system with a SCR catalyst, the method comprising: pumping a predetermined amount of the reductant through an atomizer disposed in the exhaust system, the atomizer providing a spray of reductant to the engine exhaust prior to its reaching the SCR catalyst; wherein the reductant is provided by a single fluid delivery system having a pump capable of providing reductant under a pressure to the atomizer, the pressure being sufficient to remove pyrolysed materials at the atomizer.

A single fluid exhaust dosing system for providing a reductant to a SCR catalyst of an exhaust system of an engine, the single fluid exhaust dosing system comprising: a high pressure metering pump having an inlet port and an outlet port, the inlet port being in fluid communication with a reservoir of reductant and the outlet port being in fluid communication with a conduit being in fluid communication with the outlet port at one end and an atomizer at the other, the atomizer being positioned in the exhaust system to provide reductant to the engine exhaust prior to its reaching the SCR catalyst; and a control unit receiving a plurality of signals from a plurality of sensors wherein the control unit varies the output of the pump by varying a drive current of the pump in response to the plurality of signals received from the plurality of sensors, wherein the pump is capable of providing an output pressure of reductant at the atomizer sufficient to remove pyrolysed materials on the atomizer.

The above discussed and other features and advantages will be appreciated and understood by those skilled in the art from the following detailed description and drawings.

DETAILED DESCRIPTION OF EXEMPLARY EMBODIMENTS

As discussed herein and in accordance with an exemplary embodiment, a reductant metering pump is provided which reliably delivers a discrete and accurately metered parcel of fluid of known volume, and at a pressure which is both compatible with conventional atomizers, and high enough to resist clogging by dried urea salts. The variation of the flow rate demand is accommodated via actuator drive pulse repetition rate control.

Figure 1:
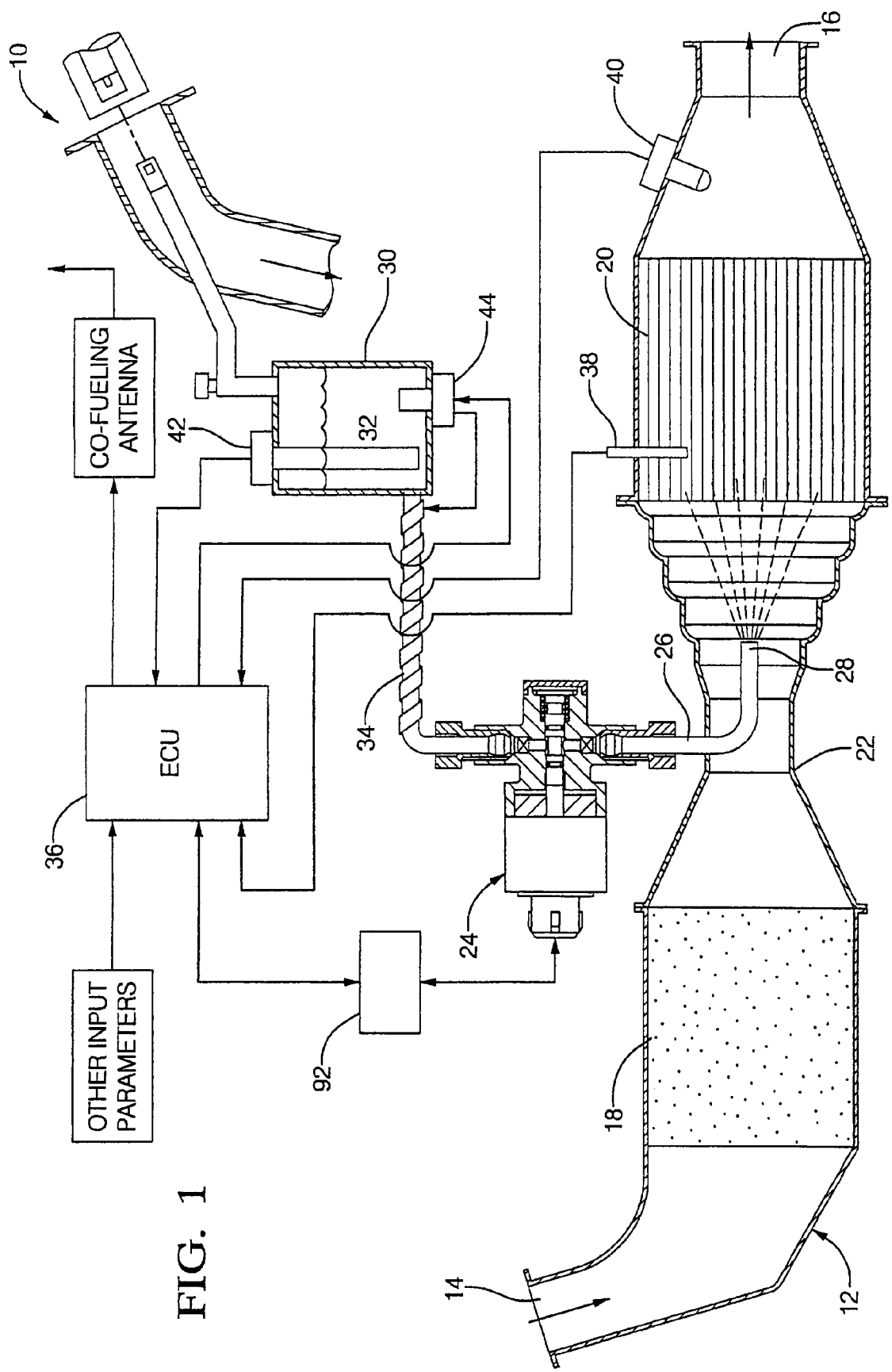
FIG. 1 is a schematic illustration of an on-board vehicle reductant delivery system in accordance with an exemplary embodiment of the present invention.

Referring now to FIG. 1, a schematic illustration of an exhaust system 10 using the apparatus and method of an exemplary embodiment of the present invention is illustrated. The illustration of FIG. 1 is provided to explain the apparatus and method of exemplary embodiments of the present invention and should not be considered as limiting the same. Exhaust system 10 comprises an exhaust path 12 having an inlet opening 14 and an outlet opening 16. Inlet opening 14 is in fluid communication with an exhaust of an engine (not shown) and outlet opening is in fluid communication with ambient atmosphere.

Disposed within exhaust path 12 is a diesel particulate filter 18 and a SCR catalyst 20. A mixing section 22 is disposed between these two items and provides fluid communication therebetween. A reductant metering pump 24 is positioned to provide a pressurized flow of reductant to an outlet conduit 26 having an atomizer 28 disposed on one end. Atomizer 28 is positioned to provide an atomized spray of reductant in the exhaust as it flows towards the SCR catalyst. The spray of reductant in combination with the SCR catalyst reduces unwanted exhaust emissions.

Reductant metering pump 24 is in fluid communication with a reservoir 30 of reductant 32 via a conduit 34. Since the consumption of the urea may be as little as 5% of fuel consumption or less, the reservoir 30 is filled less often than the vehicle's fuel tank. An engine control unit or engine control module 36 comprising a microprocessor and required algorithm(s) is in communication with reductant metering pump 24 and plurality of sensors providing signals indicative of operating parameters, which when applied to a control algorithm of the engine control unit will cause an appropriate operating signal to be sent to metering pump 24. Depending on the application (exhaust or in-cylinder), the plurality of sensors may include but is not limited to the following sensors: a temperature sensor 38, a NOx sensor 40, a reductant level sensor 42, a reductant temperature sensor, a cylinder pressure sensor, an air mass flow sensor, a humidity sensor, a temperature sensor, an engine speed sensor, fuel delivery sensor, a boost pressure sensor and boost temperature sensor.

Accordingly and through the use of the plurality of sensors, real-time and/or non-real-time post-catalyst monitoring of NOx emissions for NOx reduction confirmation are available.

Figure 4:
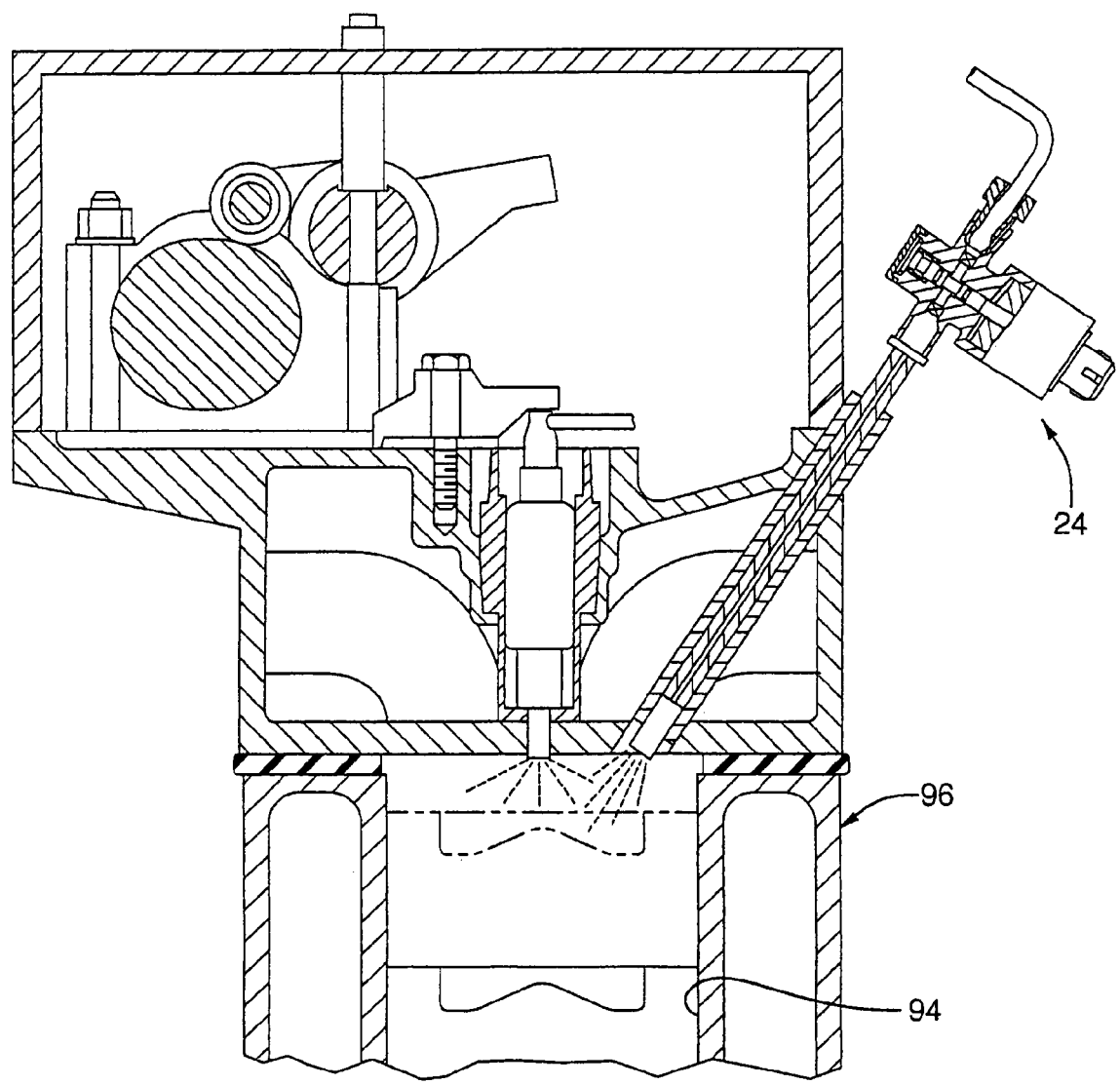
FIG. 4 is a schematic illustration of an in-cylinder reductant delivery system in accordance with an alternative embodiment of the present invention.

The controller advantageously processes these variables, which may in the FIG. 4 embodiment include cylinder pressure, and generates a NOx estimation model. In accordance with an exemplary embodiment, the processing of the above description may be implemented by a controller disposed internal, external, or internally and externally to an engine control unit (ECU). In addition, processing of the above may be implemented through a controller operating in response to a computer program. In order to perform the prescribed functions and desired processing, as well as the computations therefore, the controller may include, but not be limited to, a processor(s), computer(s), memory, storage, register(s), timing, interrupt(s), communication interfaces, and input/output signal interfaces, as well as combinations comprising at least one of the foregoing.

In accordance with an exemplary embodiment, processing may be implemented through a controller, engine control unit and/or a processing device operating in response to a computer program. In order to perform the prescribed functions and desired processing, as well as the computations therefore (e.g., the execution of fourier analysis algorithm(s), the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer and/or controller, the computer becomes an apparatus for practicing the invention. Existing systems having reprogrammable storage (e.g., flash memory) can be updated to implement the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

A heating element 44 for heating the reductant in reservoir 30 and conduit 34, heating element 44 is provided to prevent reductant 32 from freezing when exposed to temperatures which are below the freezing point of the reductant. Accordingly, the engine control module can provide the necessary commands to the various components in the exhaust system in order to limit the NOx emissions.

Figure 2:
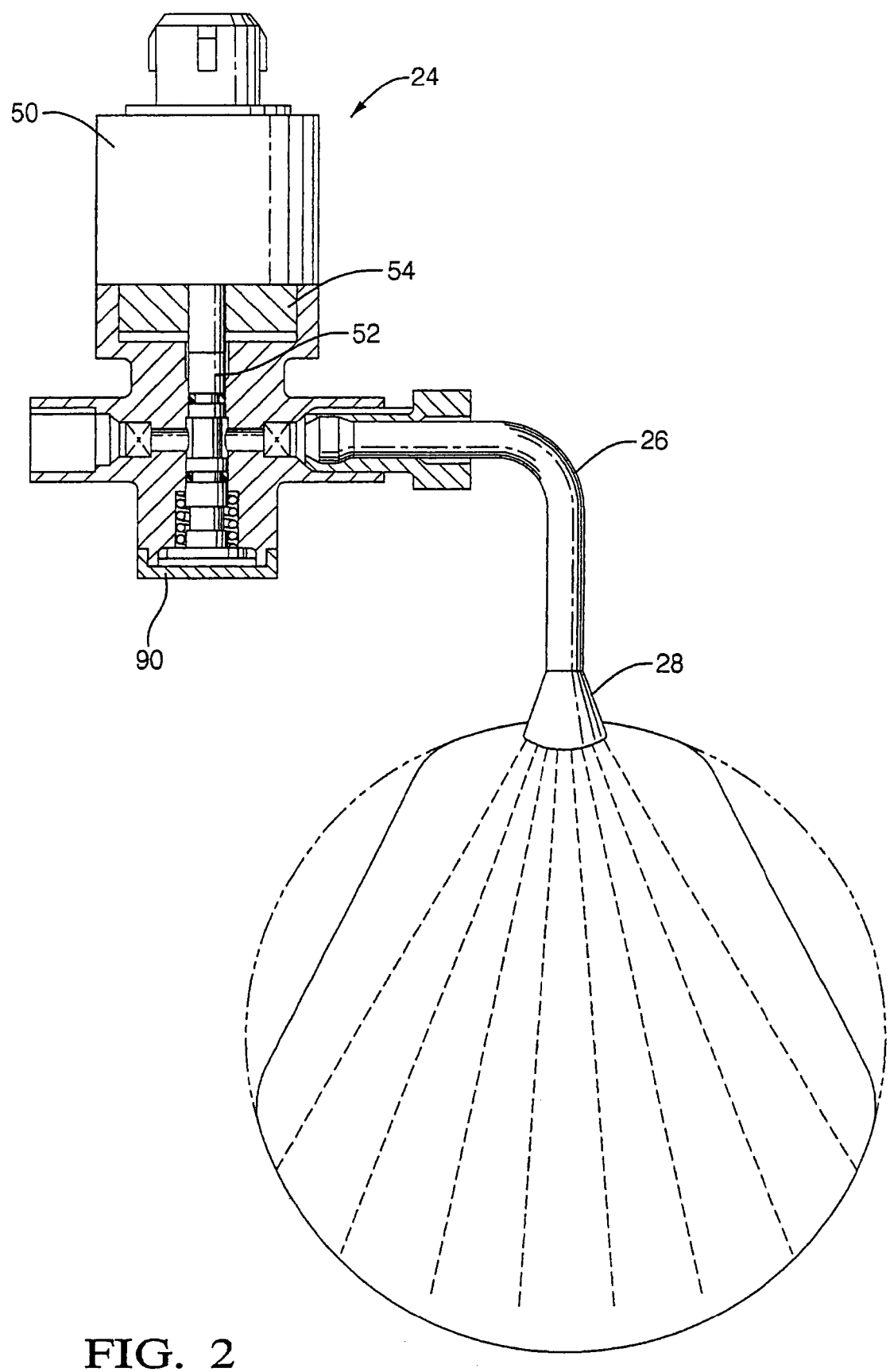
FIG. 2 is a cross sectional view of a metering pump constructed in accordance with an exemplary embodiment of the present invention.

Referring now to FIGS. 1-3 detailed views of reductant metering pump 24 in accordance with an exemplary embodiment are illustrated. As will be discussed herein reductant metering pump 24 provides high pressure reductant in a single fluid system thereby negating the need for pressurized air to be used with the exhaust system. The high pressure is suitable to blast open or unclog the atomizer thereby negating the need for a continuously fluid passing through the atomizer. In addition, and due to the high-pressure output of pump 24, the pump and its outlet conduit can be positioned as close as physically possible to the atomizer disposed in the exhaust system.

Reductant metering pump 24 comprises a solenoid 50 for effecting movement of an actuator or piston 52 of the metering pump. An exemplary solenoid contemplated for use in metering pump 24 is an E-core type of solenoid having a short stroke and providing high force. Of course, other equivalent devices are contemplated for use in exemplary embodiments of the present invention. For example, piezoelectric actuators are but one alternative device.

As is known in the related arts a solenoid typically comprises the following elements: a cylindrical coil, a ferromagnetic frame or structure, a ferromagnetic plunger and if necessary a stationary magnetic pole or travel stop. As is known in the related arts a magnetic field is generated in the solenoid by passing an electrical current through the coil. The frame or structure surrounding the coil, the plunger and the stationary magnetic pole provide a flux path to focus the magnetic field. The armature reacts to the magnetic field and is attracted to the stationary pole, wherein the movement of the armature is used to cause a desired effect, for example the opening and closing of a valve by manipulating a member or device for the desired effect.

In an exemplary embodiment pump 24 comprises an armature 54, which is actuated by the magnetic fields generated by the solenoid. Armature 54 is secured to piston 52 at one end 56 of the piston and is received within an area or armature chamber 58 of a valve housing 60. Area or armature chamber 58 is configured to allow armature 54 to move therein thereby causing the movement of piston 52. In addition, housing 60 is also secured to a housing 62 of the solenoid.

In accordance with an exemplary embodiment piston 52 has a first outer dimension 64 and a second outer dimension 66, second outer dimension 66 being larger than the first outer dimension. An intermediate outer dimension 68 is disposed between first outer dimension 64 and second outer dimension 66. In an exemplary embodiment outer dimension 66 is approximately 8 mm and outer dimension 64 is 10 mm. Of course, these dimensions may vary to those smaller or larger than the aforementioned values. Intermediate outer dimension 68 is positioned to align with a one-way intake check valve 70 and an outlet check valve 72. In addition, a stopping portion, head or flange 74 is disposed at an end of piston 52 that is opposite to end 56. Intake check valve 70 and an outlet check valve 72 are in fluid communication with an internal bore 76 of housing 60 as well as corresponding inlet and outlet ports of the pump. Internal bore 76 is configured to slidably receive piston 52 therein. In addition, the internal bore has an inner dimension which corresponds to first outer dimension 64 and another inner dimension, which corresponds to second outer dimension 66. In addition, inner bore 76 also comprises another pair of inner dimensions and corresponding shoulder portions 78 and 80 to engage a biasing member 82 and stopping portion 74 being larger than the first outer dimension.

Figure 3A:
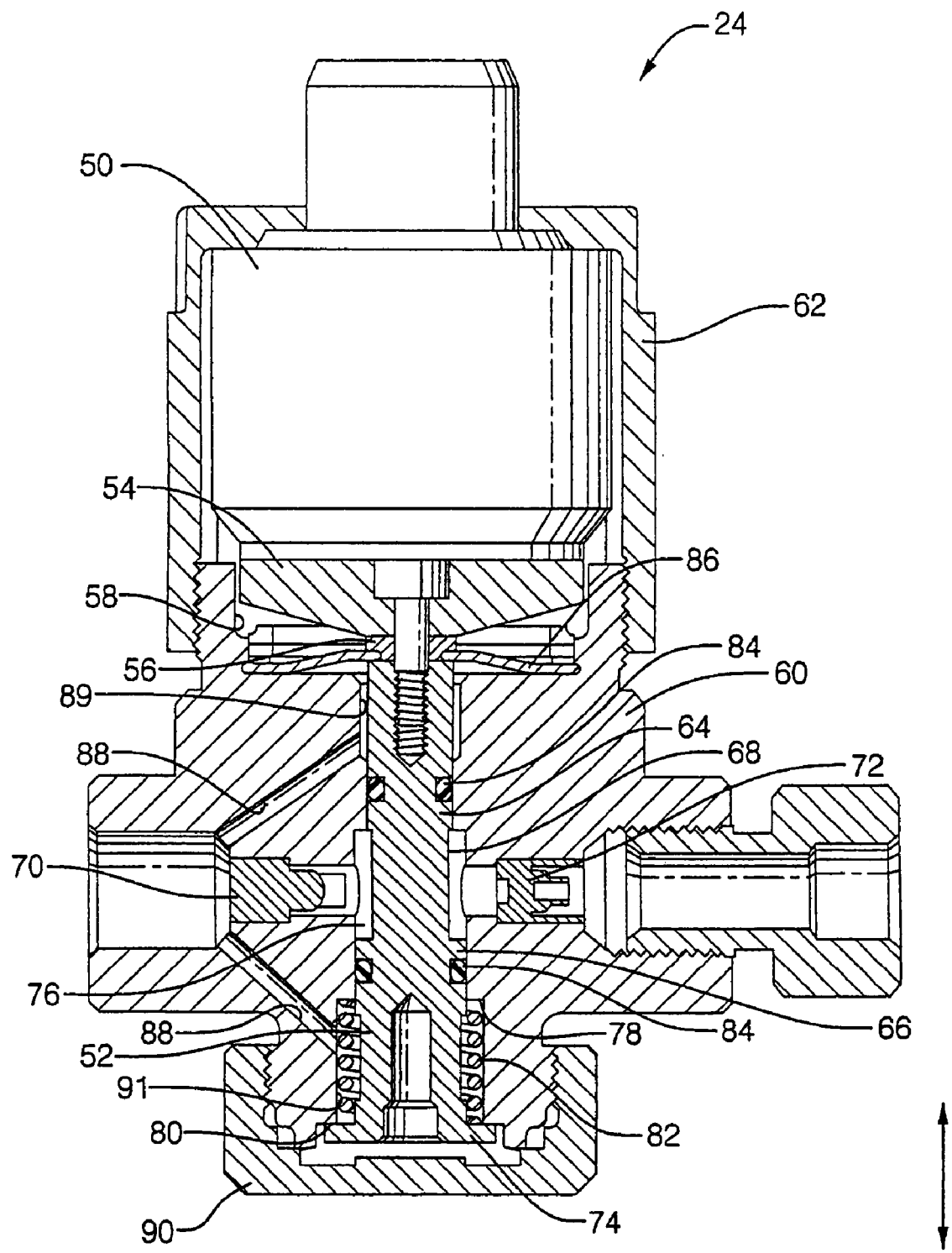
FIGS. 3A and 3B are cross sectional views of a metering pump constructed in accordance with an exemplary embodiment of the present invention.
Figure 3B:
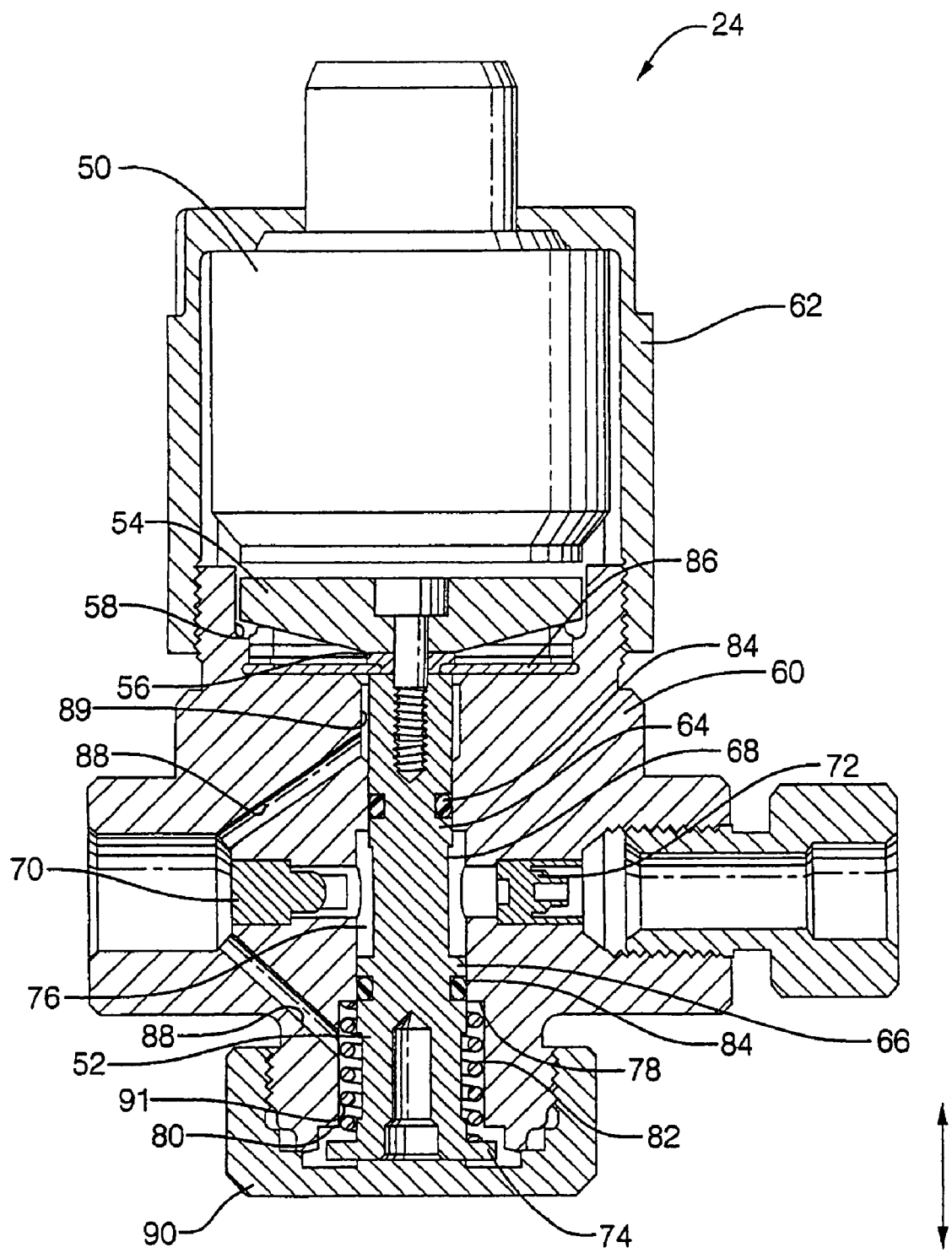

As illustrated in FIGS. 3A and 3B as the piston is moved up and down by the solenoid the area disposed between intermediate outer dimension 68 and check valves 70 and 72 varies or is decreased by movement of the piston to a limit of its stroke. Accordingly, the pressure of the fluid in this area is increased and is dispersed under pressure into conduit 26 upon reaching the relief limit of check valve 72.

In an alternative embodiment, a pair of O-rings 84 are positioned on the surface of piston 52 in order to maintain a seal between piston 52 and the inner bore of the housing. In addition, a flexible diaphragm 86 is secured to end 56 of piston 52 and a portion of area or armature chamber 58 in order to provide a seal between inner bore 76 and area or armature chamber 58. This seal will prevent the materials of the reductant from entering area or armature chamber 58 and damaging solenoid 50. For example, the chemical composition of the urea could be corrosive to the solenoid.

In addition, and in order to run the piston in a "wet" chamber a pair of drillings or openings 88 are provided. One of the drillings goes from the inlet chamber to an upper chamber 89 just below the diaphragm and the other goes from the inlet chamber to the area or lower chamber 91 housing the return spring. As illustrated in the Figures the upper chamber is slightly larger than the outer dimension 64 disposed between the upper chamber and the pressure chamber disposed between intake check valve 70 and outlet check valve 72. Also, the lower chamber is slightly larger than the outer dimension 66 disposed between the lower chamber and the pressure chamber. Accordingly, by allowing fluid flow through the pair of drillings negative forces, which may adversely effect movement of the piston in the bore of the valve housing, are eliminated.

A stroke limit or stopping member 90 is secured to valve housing 60 to provide a stop for the enlarged head portion of piston 52 which is received within the area defined by shoulder portion 80 and stopping member 90.

During operation the pump is run all the time the catalyst is active, unless of course the ECU determines that in accordance with predetermined conditions sensed by the plurality of sensors the pump is to be shut off. The catalyst having an active state is generally defined by the catalyst having an active or operating temperature range defined by a low of 180 degrees C. and a high of 500 degrees C., which is also determined by the plurality of sensors in communication with the ECU. Of course, the operating ranges of the catalyst may vary depending on the catalyst itself wherein ranges greater or less than those provided above are available. Of course, the pump is shut off when the engine is shut off.

Control signals from the ECU 36 will control the operation of the pump. Control signals can be provided in pulse width and/or frequency modulated electrical power. By varying the frequency or the pulse width the speed and pressure provided by the pump can be varied.

In accordance with an exemplary embodiment, a solenoid activated high-pressure reductant metering is provided to the exhaust stream via a closely coupled single-fluid atomizer. The stepped plunger, actuator or piston reciprocates in an appropriately stepped bore. The plunger has an armature attached to the end with the smaller diameter and a spring positioned to act upon the larger diameter. The spring biases the plunger in the downward position where the lower flange rests against the lower end cap or stopping member. The pump body has a spring loaded inlet check valve, and a similar outlet valve both located adjacent to a cavity in which the stepped plunger operates. Reductant is supplied to the pump via the inlet port where it enters the pump cavity through the check valve. In operation, reductant at a low feed pressure fills the pumping chamber. When energized, the solenoid actuator attracts the armature which cause the plunger to travel upwards. Because the plunger lower diameter is larger than the upper diameter, a differential area exists and reductant is pressurized in the chamber as the plunger strokes. The reductant under pressure therefore passes out through the outlet valve and into the transfer line to the atomizer. It will be understood that the displaced quantity will be proportional to the piston differential area times the plunger stroke minus the working fluid compressibility. The plunger stroke is established during initial assembly, being controlled by suitable shim selection in the end cap as may be appropriate for the application. When energized, the plunger lower flange is arrested by the body at the end of travel, resulting in a fixed-length stroke. The reductant delivery variation over unit time, as may be required by the emissions control system is achieved through operating frequency-modulation rather than plunger stroke amplitude-modulation, although this can be an alternative if desired.

It will be understood that the pressure generated in the pumping chamber will be a function of the force developed by the piston, and a differential area of the plunger, either of which may be changed to provide application flexibility. If the pump is used in conjunction with low-pressure air-assisted reductant atomizers, a low force actuator may be specified. Conversely, a high force actuator may be appropriate when used in accordance with the exemplary embodiment of a single-fluid metering pump configuration. Because of the propensity for the atomizer clogging closed from pyrolysed salts of the aqueous urea reductants, a high force actuator is required to generate high pump pressure (e.g., 100 bar), and thus enable the device to be self-cleaning on a continuous basis. High pump pressure is also contemplated to include pressures greater or less than 100 bar.

In accordance with an exemplary embodiment, a reductant metering pump is provided which reliably delivers a discrete and accurately metered parcel of fluid of known volume, and at a pressure which is both compatible with conventional atomizers, and high enough to resist clogging by dried urea salts. The variation of the flow rate demand is accommodated via actuator drive pulse repetition rate control.

Located between the system control module and the actuator, is a "smart" drive box or electronic device 92 which provides a current waveform to the actuator in response to a control logic input signal. The drive box incorporates drive current, "glitch detection" which indicates when the armature has traveled full stroke, thus providing a "confirmation of delivery" diagnostic to the control system. Further, the drive current peak level may be modulated to vary the pumping pressure to suit the prevailing conditions at the atomizer. For example, if the pumping pressure and atomizer spray pattern are optimized to achieve an even and homogeneous dispersion of the reductant with the exhaust gases at the full load rated speed condition, then it will be far from optimum at a light load low speed condition, where over-penetration and wall deposition is likely to occur. In this latter case, depending on the atomizer and exhaust system geometry, a lower actuator force thus a lower pump pressure is likely to be optimum, and can be commanded.

In addition to the conventional in-exhaust injection of reductant as discussed above with regard to FIGS. 1-3B, it is possible to inject reductant in to the cylinders of the diesel engine, as for example in commonly owned and assigned U.S. patent application Ser. No. 10/183,737, filed Jun. 27, 2002, the contents of which are incorporated herein by reference thereto. An example of such an application is illustrated in FIG. 4 wherein a metering pump 24 is positioned to provide reductant into a cylinder 94 of an engine 96. Of course, the number of pumps may vary with the number of cylinders requiring reductant. Since the timing of this injection is critical and has to occur late on the engine expansion stroke, a high-pressure injection is necessary, as is possible with the above-described device. Other known reductant dosing systems have only low-pressure capability, and thus are unsuitable for this in-cylinder application.

It is proposed that this metering pump should be closely coupled to the atomizer located in the exhaust system or in the cylinder head as described above. This will minimize the transport delays between pump discharge and atomizer outlet, therefore improving transient response. One objective of this arrangement is to reduce to a minimum the volume of urea which is subject to exhaust heating and pyrolysation during operating conditions when reductant is not being demanded. In this manner, a clean resumption of reductant metering may be obtained when demand is restored.

The metering pump described herein may be used in conjunction with many different types of atomizers. These include the simple open orifice nozzle, the inward opening closed nozzle, the outward opening poppet nozzle (U.S. Pat.

No. 4,116,591), the vaporizing nozzle, and many others. The atomizer may be located centrally and axially within the exhaust pipe section, or may be located externally on the exhaust periphery and projecting across the pipe or duct. A "fan" spray is illustrated by way of example in an exhaust pipe locally formed into a matching trapezoidal shape. In all cases, the objective is to select an atomizer appropriate to the specific exhaust system geometry, which will achieve the complete homogeneous mixing of reductant and exhaust gas in the shortest possible length. The metering device described here has a wider potential selection of atomizer technologies and geometries than is available to the known and air-assisted designs, thus it can be expected to offer greater application flexibility.

Figure 5A:
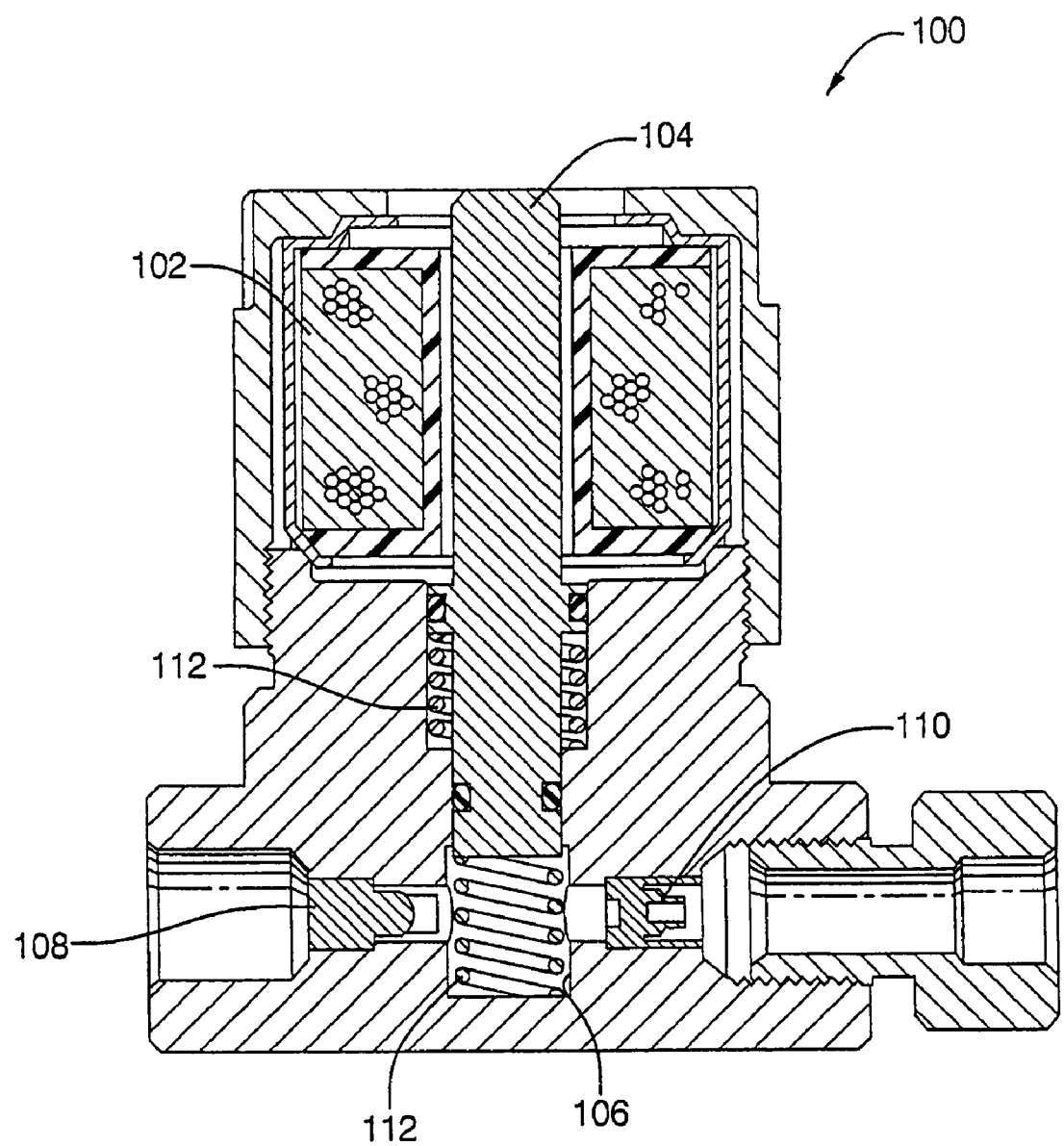
FIGS. 5A and 5B are cross sectional views of metering pumps constructed in accordance with alternative exemplary embodiments of the present invention.
Figure 5:
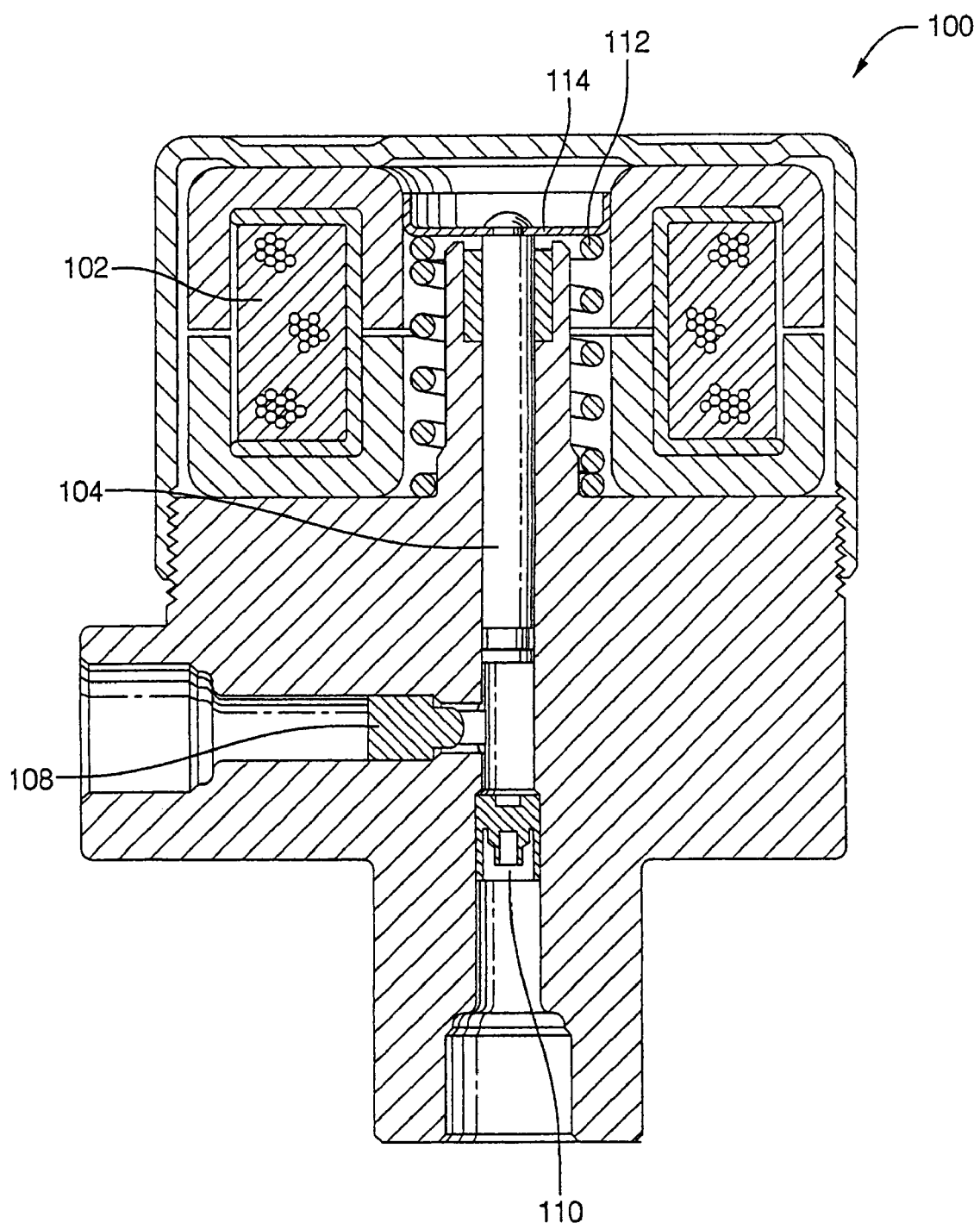

Referring now to FIGS. 5A and 5B alternative embodiments of the metering pump are illustrated. In FIG. 5A metering pump 100 comprises a solenoid 102 for generating a magnetic field, which according to the frame or structure surrounding the coil provides a flux path to focus the magnetic field of the solenoid wherein a plunger 104 disposed within a central opening of a spool of the coil reacts to the magnetic field and is manipulated by the magnetic field. Accordingly, the movement of the plunger is used to cause a desired effect (e.g., pumping of the reductant). Here a pressure chamber 106 is disposed between an inlet check valve 108 and an outlet check valve 110. A biasing member 112 is disposed in an appropriate location to provide a biasing force to the plunger to move it back towards a prone position which corresponds to the position of the plunger when the coil of the solenoid is not energized. Thus, the desired high pressure pumping effect is achieved by providing an excitation to the coil. Although the biasing members are shown in but two locations it is contemplated that a single biasing member may be employed. In addition, the location of the biasing member may vary as long as the desired affect is applied to the plunger. It is also noted that the varying dimensions of the piston and the bores into which it is received and conduits 88 of the FIG. 3 embodiment are not necessary with this design as long as the high pressure delivery of the reductant or urea can be achieved.

In yet another alternative, and as illustrated in FIG. 5B an alternative high force short stroke solenoid is used with the metering pump wherein the magnetic field generated by the solenoid causes an armature 114 to move wherein movement of the armature causes the desired movement of plunger 104 secured thereto.

As discussed, herein the term "engine" is meant in the broad sense to include all combustors which combust hydrocarbon fuels to provide heat, e.g., for direct or indirect conversion to mechanical or electrical energy. Internal combustion engines of the Otto, Diesel and turbine types, as well as burners and furnaces, are included and can benefit from the invention. The diesel engine is in this description for purposes of providing an example. Stationary and mobile engines are also contemplated to be within the scope of exemplary embodiments of the present invention.

The term "Diesel engine" includes all compression-ignition engines, for both mobile (including marine) and stationary power plants and of the two-stroke per cycle, four-stroke per cycle or other plurality of strokes, and rotary types. The term "hydrocarbon fuel" includes all fuels prepared from "distillate fuels" or "petroleum" (e.g., gasoline, jet fuel, diesel fuel, and various other distillate fuels). The term "distillate fuel" means all of those products prepared by the distillation of petroleum or petroleum fractions and residues. The term "petroleum" is meant in its usual sense to include all of those materials regardless of source normally included within the meaning of the term, including hydrocarbon materials, regardless of viscosity, that are recovered from fossil fuels.

The term "diesel fuel" means "distillate fuels" including diesel fuels meeting the ASTM definition for diesel fuels or others even though they are not wholly comprised of distillates and can comprise alcohols, ethers, organo-nitro compounds and the like (e.g., methanol, ethanol, diethyl ether, methyl ethyl ether, nitromethane). Also within the scope of this invention, are emulsions and liquid fuels derived from vegetable or mineral sources such as corn, alfalfa, shale, and coal. These fuels may also contain other additives known to those skilled in the art, including dyes, cetane improvers, anti-oxidants such as 2,6-di-tertiary-butyl-4-methylphenol, corrosion inhibitors, rust inhibitors such as alkylated succinic acids and anhydrides, bacteriostatic agents, gum inhibitors, metal deactivators, upper cylinder lubricants, antiicing agents and the like.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. It should also be noted that the terms "first", "second", and "third" and the like may be used herein to modify elements performing similar and/or analogous functions. These modifiers do not imply a spatial, sequential, or hierarchical order to the modified elements unless specifically stated.

What is claimed is:

1. A method for providing a reductant to an exhaust of an engine having an exhaust system with a SCR catalyst, comprising:
    pumping a predetermined amount of the reductant under pressure through an atomizer disposed in the exhaust system, with a single-fluid deliver system comprising a pump having an inlet port and an outlet port, said inlet port having an inlet check valve associated therewith and being in fluid communication with a reservoir of reductant, and said outlet port having an outlet check valve associated therewith and being in fluid communication with a conduit being in fluid communication with said outlet port at one end and an atomizer at the other;
    said atomizer providing a spray of reductant to the engine exhaust prior to its reaching the SCR catalyst;
    wherein said pressure is sufficient to remove pyrolysed materials on said atomizer.

2. The method as in claim 1, wherein said pressure is 100 bar.

3. The method as in claim 1, further comprising:
    varying the pressure at which the reductant is applied by employing a control unit to vary a drive current of a pump in response to a plurality of signals received by said control unit from a plurality of sensors.

4. The method as in claim 3, further comprising:
    employing an electronic device which provides a signal to said control unit when an armature of said pump has traveled full stroke, thereby providing a "confirmation of delivery" diagnostic to the control unit.

5. The method as in claim 4, further comprising:
    varying the pumping pressure of the pump according to either engine load or engine speed.

6. The method as in claim 1, wherein said high-pressure metering pump comprises: a solenoid for actuating a piston slidably received within an inner bore of a valve housing of the pump, said piston having at least two outer dimensions one being larger than the other and said inner bore having a pressure chamber with said inlet check valve and said outlet check valve, wherein movement of said piston causes said at least two outer dimensions to at least partially move into and out of said pressure chamber thereby increasing the pressure of fluid received in said pressure chamber and said piston is secured to an armature at one end, said armature being configured for movement within an area of said valve housing, said armature being moved by said solenoid; and a diaphragm being secured to said piston at one end and said area at the other, wherein said diaphragm provides a seal between said armature and said inner bore.

7. The method as in claim 6, wherein said high-pressure metering pump wherein said valve housing comprises an inlet conduit, wherein said inlet check valve is disposed between said inlet conduit and said pressure chamber; and a pair of conduits providing fluid communication between an upper chamber and a lower chamber of said inner bore and said inlet conduit, wherein one of said pair of conduits provide fluid communication to one side of said pressure chamber and the other one of said pair of conduits provide fluid communication to another side of said pressure chamber and said upper chamber is larger than one of said dimensions of said piston and said lower chamber is larger than the other one of said dimensions of said piston and an intermediate dimension of said inner bore is disposed between said pressure chamber and said upper chamber and said pressure chamber and said lower chamber.

8. The method as in claim 6, wherein the reductant is an aqueous urea solution

9. The method as in claim 6, wherein the reductant is non-urea reductant.

10. The method as in claim 6, wherein the reductant is a hydrocarbon fuel for diesel particulate filter (DPF) regeneration.

\* \* \* \* \*